United States Patent
Huang et al.

(10) Patent No.: US 12,374,036 B2
(45) Date of Patent: Jul. 29, 2025

(54) SINGLE IMAGE THREE-DIMENSIONAL HAIR RECONSTRUCTION

(71) Applicant: Snap Inc., Santa Monica, CA (US)

(72) Inventors: Zeng Huang, Los Angeles, CA (US); Menglei Chai, Los Angeles, CA (US); Sergey Tulyakov, Marina del Rey, CA (US); Kyle Olszewski, Los Angeles, CA (US); Hsin-Ying Lee, San Jose, CA (US)

(73) Assignee: Snap Inc., Santa Monica, CA (US)

( * ) Notice: Subject to any disclaimer, the term of this patent is extended or adjusted under 35 U.S.C. 154(b) by 448 days.

(21) Appl. No.: 17/814,063

(22) Filed: Jul. 21, 2022

(65) Prior Publication Data

US 2024/0029346 A1     Jan. 25, 2024

(51) Int. Cl.
    *G06T 17/00*          (2006.01)
    *G06T 15/04*          (2011.01)

(52) U.S. Cl.
    CPC .............. *G06T 17/00* (2013.01); *G06T 15/04* (2013.01); *G06T 2207/10028* (2013.01)

(58) Field of Classification Search
    CPC ..................... G06T 17/00; G06T 15/04; G06T 2207/10028
    See application file for complete search history.

(56) References Cited

U.S. PATENT DOCUMENTS 11,972,529 B2 * 4/2024 Li ........................... G06T 15/04

FOREIGN PATENT DOCUMENTS

WO    WO-2024020559 A1    1/2024

OTHER PUBLICATIONS

"International Application Serial No. PCT US2023 070732, International Search Report mailed Oct. 25, 2023", 4 pgs.
"International Application Serial No. PCT US2023 070732, Written Opinion mailed Oct. 25, 2023", 6 pgs.
Keyu, Wu, "NeuralHDHair: Automatic High-fidelity Hair Modeling from a Single Image Using Implicit Neural Representations", aexiv.org, Cornell University Library, 201 Olin Library Cornell University Ithaca, NY 14853, (May 9, 2022), 11 pgs.
Saito, Shunsuke, "PIFu: Pixel-Aligned Implicit Function for High-Resolution Clothed Human Digitization", 2019 IEEE CVF International Conference on Computer Vision (ICCV), IEEE, (Oct. 27, 2019), 2304-2314.
Xingyu, Ren, "Facial Geometric Detail Recovery via Implicit Representation", arxiv.org, Cornell University Library, 201 Olin Library Cornell University Ithaca, NY 14853, (Mar. 18, 2022), 25 pgs.
"International Application Serial No. PCT/US2023/070732, International Preliminary Report on Patentability mailed Jan. 30, 2025", 8 pgs.

* cited by examiner

*Primary Examiner* — Diane D Mizrahi
(74) *Attorney, Agent, or Firm* — Schwegman Lundberg & Woessner, P.A.

(57) ABSTRACT

A system to enable 3D hair reconstruction and rendering from a single reference image which performs a multi-stage process that utilizes both a 3D implicit representation and a 2D parametric embedding space.

20 Claims, 11 Drawing Sheets

SINGLE IMAGE THREE-DIMENSIONAL HAIR RECONSTRUCTION

BACKGROUND

Augmented reality (AR) is an interactive experience of a real-world environment where the objects that reside in the real world are enhanced by computer-generated perceptual information, sometimes across multiple sensory modalities. AR can be defined as a system that incorporates three basic features: a combination of real and virtual worlds, real-time interaction, and accurate three-dimensional (3D) registration of virtual and real objects.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
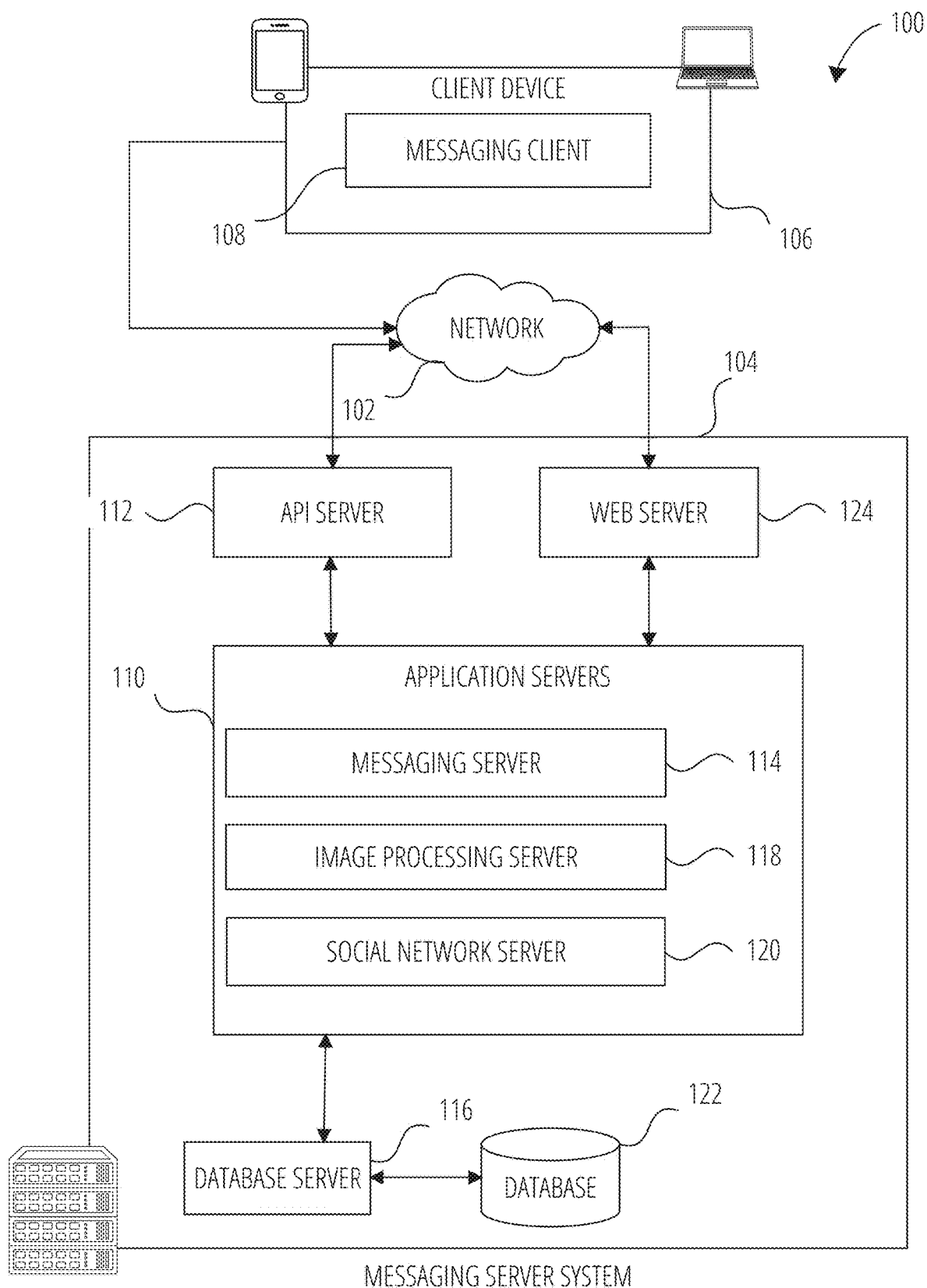
FIG. 1 is a diagrammatic representation of a networked environment in which the present disclosure may be deployed, in accordance with some examples.

Individuals often express themselves through various unique hairstyles. From short to long, curly to wavy, layered to straight, frizzy to shiny, blonde to black, or even braid structures like pony tails and dreadlocks—the existence of an infinite number of hairstyles gives rise to the urge to virtually "try-on" arbitrary hairstyles from reference photos to another person.

Unfortunately, unlike most other parts of the human face, the extraordinary complexity of both the geometry and appearance of hair, including the highly detailed surface shape and the complicated material properties, makes it extremely difficult to reconstruct and render. Even empowered by recent advances in deep neural networks and the increasing accessibility to large-scale human datasets, recent advancements in the relevant field are limited to one particular part of the whole picture. Some works focus on geometry reconstruction, but the results are either too smooth to guide detailed rendering or built from special fiber-based geometries that are prohibitively difficult to incorporate appearance representations. Other works study neural-based hair rendering, but requiring the input geometries to be manually created or in particular formats that are vastly distinct from what can be reconstructed from an image. As such, there is no "end-to-end" solution that integrates both geometry reconstruction and appearance capturing to enable exemplar-based hair try-on.

Accordingly, a system to enable 3D hair reconstruction and rendering from a single reference image is described herein. According to certain embodiments, a 3D try-on pipeline may perform a multi-stage process that utilizes both a 3D implicit representation and a 2D parametric embedding space. For example, the pipeline may reconstruct a surface geometry (i.e., 3D shape) of a target object by applying an implicit shape representation model to recover the 3D shape and segmentation mask, wherein the segmentation mask may identify a portion of the 3D shape that corresponds with hair depicted in an input image, Based on the predicted geometry, a 2D canonical feature space is generated which projects image features from the 3D implicit representation to the 2D canonical feature space. Finally, the canonical latent texture is projected to a target image.

For example, given an input image (i.e., a portrait image depicting a person's head), a 3D try-on pipeline may perform operations to reconstruct a hair model based on the input image, and realistically render the hair model under a novel perspective to align the hair model with a target image. Accordingly, the 3D try-on pipeline may reconstruct a 3D model (i.e., hair shape) by extending framework of pixel-aligned implicit functions to use both global and local features to predict "hair shape" beyond what is visible within the input image. Next, the pipeline may perform a method of canonical UV unwrapping to synthesize hair texture features in 2D. For example, the 3D try-on pipeline may fill the missing portions of the unwrapped 2D feature space by projecting features from the input image upon the missing portions of the unwrapped 2D feature space.

A "hair shape" may be defined as a manifold surface that approximates the outer hull of the hair depicted in the input image. The pipeline may reconstruct the hair shape in a canonical coordinate system, where the hair shape is in a predefined rest pose, and is invariant to camera view of the input image. A 3D face tracking method may fit a 3D morphable face model with camera parameters to the input image. The camera parameters define projection mapping from the face model space to image pixel coordinates. The pipeline may then use the coordinate system of the estimated face model as head canonical coordinates, as they represent the pose of the head, where the hair is attached.

In some embodiments, the mapping may normalize the size of the object (i.e., head) depicted in the input image regardless of the scale in which the object appears, allowing the reconstructions performed by the 3D try-on pipeline to be invariant to the actual size and proportions of the person depicted in the input image.

According to certain embodiments, following the pixel-aligned implicit representation, the 3D try-on pipeline may represent the hair shape with implicit functions. For example, the pipeline may reconstruct the whole hair shape of the region around the head depicted in the input image that is near and above shoulder lines, and extract a region (i.e., the hair region) by predicting a segmentation mask for each point on the surface of the hair shape. Accordingly, an occupancy map may implicitly represent the 3D hair shape.

To estimate the occupancy map and the segmentation mask, the 3D try-on pipeline may extract both local and global feature representations. Local features are pixel-aligned, and are therefore effective at predicting occupancy for visible pixels, while not being able to operate outside the image border. In contrast, global features are holistic are represent the shape as a whole and can estimate invisible parts.

Two neural networks may be trained to take a canonical coordinate, its corresponding 2D position, and the 2D image feature as inputs in order to estimate occupancy. To extract both local and global features from the input image, the 3D try-on pipeline may use a "ResNet34" architecture. Pixel-aligned features may be extracted using hi-linear interpolation from four latent feature maps of ResNet34 respectively, and concatenate—them together to form the local feature. The global feature is produced by a fully-connected layer following the last feature map of ResNet34.

Because the input image is a 2D image, a substantial portion of the hair is not visible. Accordingly, in certain embodiments, the 3D try-on pipeline may perform operations to estimate the obstructed portions of the hair in the input image. According to certain embodiments, the 3D try-on pipeline may map the input image to a 2D ITV space according to the 3D hair shape surface. Mapping the input image copies the visible textures and features from the input image to the 2D UV space and also has the added function of generating an occlusion/segmentation mask.

According to certain embodiments, given the input image and the corresponding hair shape, the 3D try-on pipeline may "unwrap" both the input image and a 3D model representative of the hair shape to generate a UV canonical space. The segmentation mask may then be applied the unwrapped input image resulting in the visible part of the hair texture from the input image. To fill the obstructed/invisible portion of the hair texture, a neural network is trained to take a partial image and the segmentation mask as inputs in order to estimate/fill the obstructed/invisible portion of the hair texture.

Having generated a hair representation, the 3D try-on pipeline may perform operations to render the hair representation and blend it with a target image. Accordingly, the 3D try-on pipeline may apply the "hair shape" generated based on the input image as the surface, image features from the input image as the texture feature map, camera parameters, and use a differential rendering layer to project the features to the target image. In some embodiments, a convolutional neural network may thereby generate an image of hair, which the 3D try-on pipeline may blend into the target image.

According to certain embodiments, a pipeline to generate AR content based on an input image depicting an object is described. In some embodiments, the input image may include a depiction of a person's head, and the system may enable a user to transfer hair (or a lack of hair associated with the input image) to an image presented at a client device. As discussed above, due to the complexity of hair structures, existing systems to enable users to "try-on" different hairstyles require a pre-defined hair model or manual labeling, which restricts their applications to only professional use and limits their scale. Accordingly, the disclosed system seeks to provide a pipeline which requires only a single input image (i.e., a portrait photo) to generate photo-realistic novel view, novel pose, hair images.

According to certain embodiments, a 3D try-on pipeline may be configured to perform operations that include: accessing or otherwise receiving an input image, wherein the input image comprising a set of image features that depict a display of an object; generating a 3D shape based on the set of image features that depict the object; generating a UV texture map based on the input image and the 3D shape; generating a 3D model based on the 3D shape and the UV texture map; and causing display of a presentation of the 3D model at a position within a target image.

In some embodiments, generating the 3D shape based on the set of image features of the input image that depict the object further comprises: extracting a set of global features and a set of local features from the input image; performing a pixel-aligned implicit function based on the set of global features and the set of local features; and generating the 3D shape based on the pixel-aligned implicit function.

A UV texture map may refer to an image applied (mapped) to a surface of a shape or polygon, wherein the UV texture map may include a bitmap image or a procedural texture. In some embodiments, the 3D try-on pipeline may generate the UV texture map based on the input image and the 3D shape by performing operations that include: generating a projection based on the input image; generating a segmentation mask based on a portion of the 3D shape; and generating the UV texture map based on the projection and the segmentation mask.

In some embodiments, to display the presentation of the 3D model at the position within the target image, the #d try-on pipeline may perform operations further comprising: determining a set of canonical coordinates of the 3D model based on the input image, wherein the canonical coordinates may includes sets of coordinates on a phase space which can be used to describe a physical system at any given point in time; and causing display of the presentation of the 3D model at the position within the target image based on the canonical coordinates.

In some embodiments, the object depicted in the input image is a first object, and in order to display of the presentation of the 3D model at the position within the target image, the 3D try-on pipeline may perform operations further comprising: identifying a second object within the target image, wherein the second object may include a head; and causing display of the presentation of the 3D model at the position within the target image based on the second object.

In some embodiments, to display the presentation of the 3D model at the position within the target image, the 3D try-on pipeline may perform operations to adjust a scale of the 3D model. For example, in some embodiments the 3D try-on pipeline may normalize a size of the 3D model and a size of an object depicted in the target image (i.e., a human head).

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108, While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108, Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
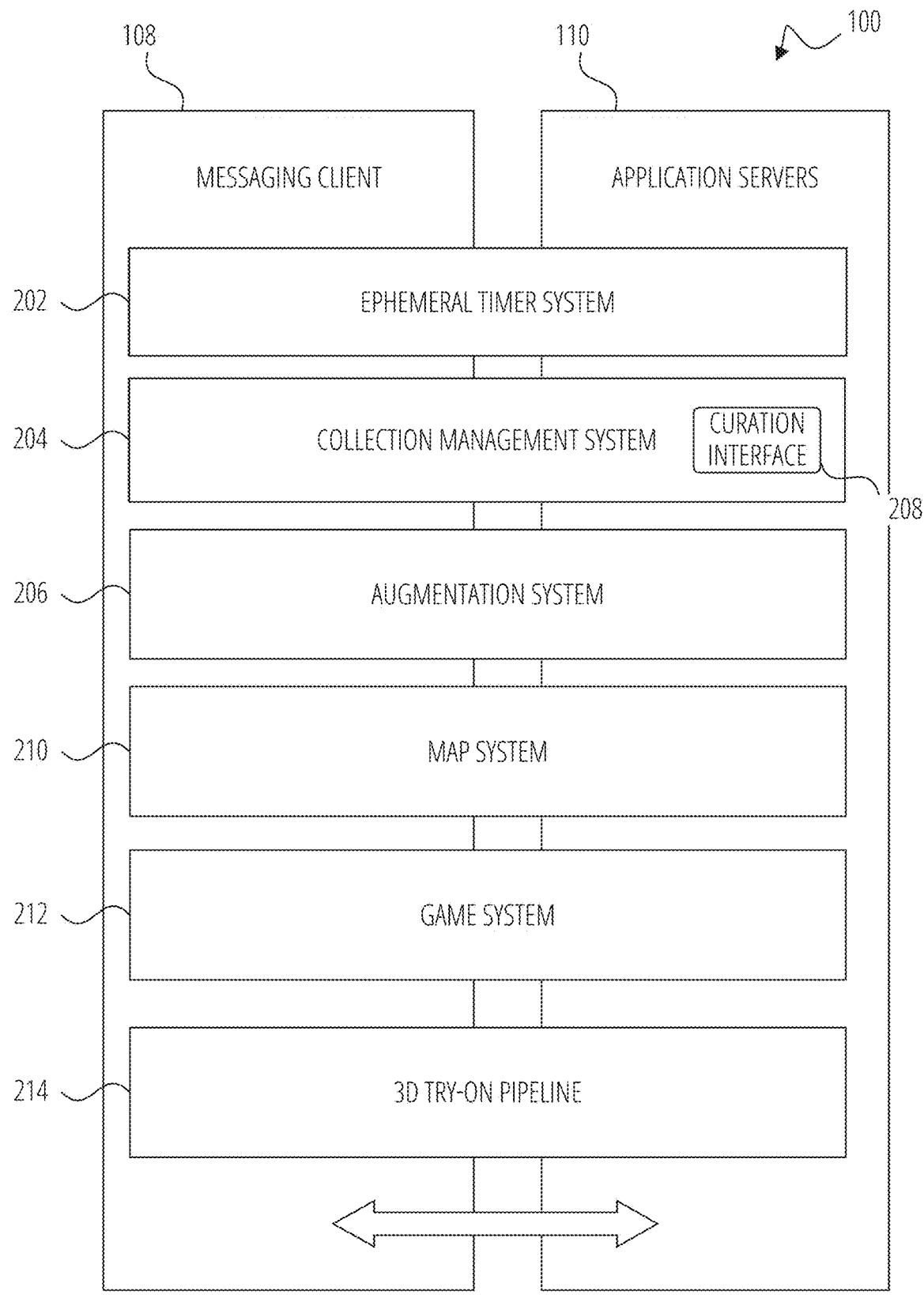
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a 3D Try-On Pipeline 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108, Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects, An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The 3D Try-On Pipeline 214 provides functions that may include: accessing an input image, the input image comprising a set of image features that depict a display of an object; generating a three-dimensional (3D) shape based on the set of image features that depict the object; generating a UV texture map based on the input image and the 3D shape; generating a 3D model based on the 3D shape and the UV texture map; and causing display of a presentation of the 3D model at a position within a target image.

Figure 3:
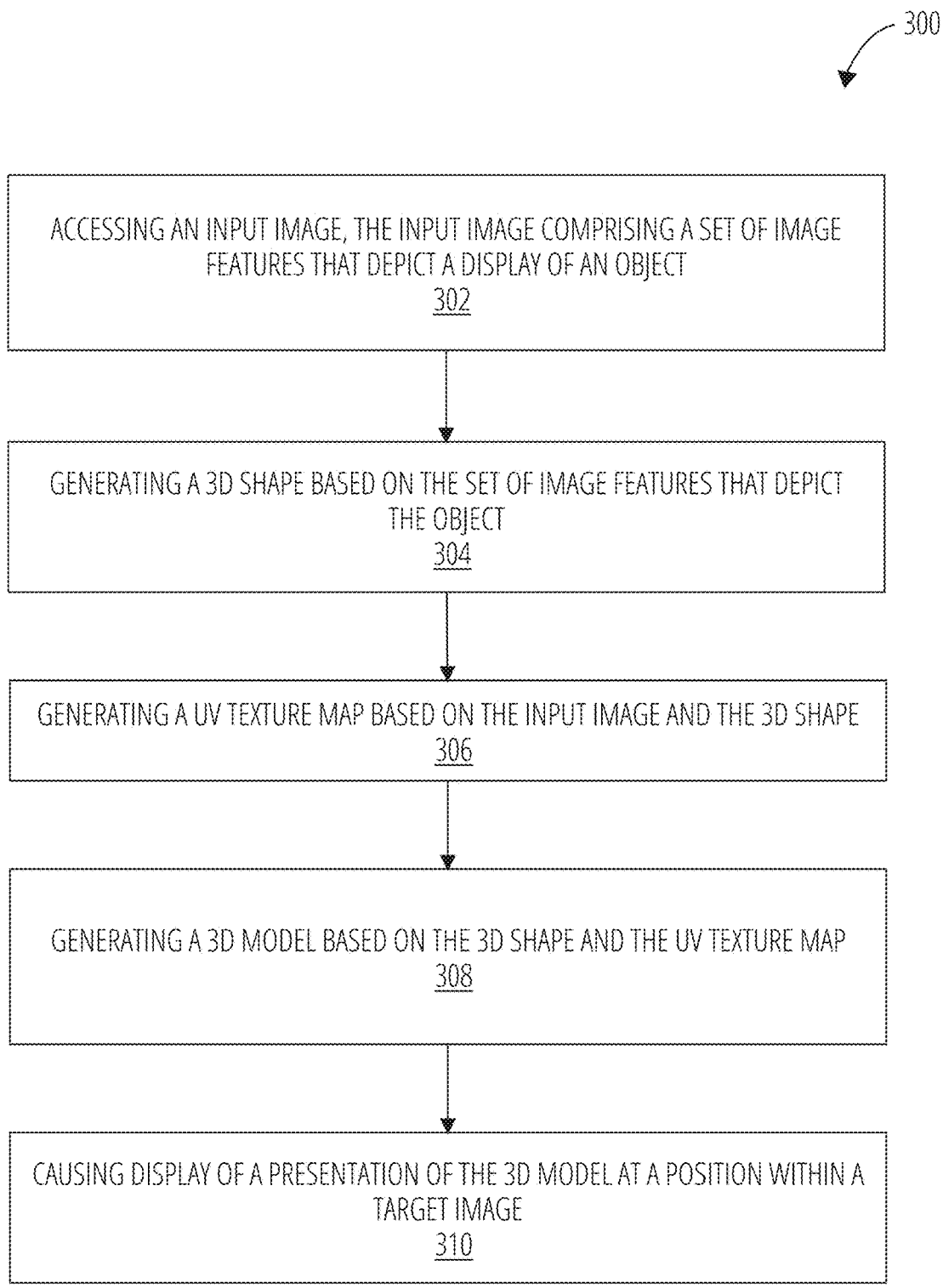
FIG. 3 is a flowchart depicting a method for generating a 3D shape based on an input image, in accordance with one embodiment.

FIG. 3 is a flowchart illustrating operations of a 3D Try-On Pipeline 214 in performing a method 300 for generating and causing display of a presentation of a 3D model, in accordance with one embodiment. Operations of the method 300 may be performed by one or more subsystems of the messaging system 100 described above with respect to FIG. 2, such as the 3D Try-On Pipeline 214, As shown in FIG. 3, the method 300 includes one or more operations 302, 304, 306, 308, and 310.

At operation 302, the 3D Try-On Pipeline 214 may access or otherwise receive an input image, wherein the input image comprises a set of image features that depict a display of an object. For example, a user of a client device 106 may provide the input image to the 3D Try-On Pipeline 214.

At operation 304, a 3D shape is generated based on the set of image features that depict the object. For example, in some embodiments, to construct the 3D model, the 3D Try-On Pipeline 214 may extend the framework of pixel-aligned implicit functions to use both global and local features to generate the 3D shape beyond the parts of the object that are visible in the input image.

At operation 306, a UV texture map is generated based on the input image and the 3D shape generated in operation 304, example, the 3D Try-On Pipeline 214 may segment an object from within the input image (i.e., a depiction of a human head), and generate a projection based on the segmented object, wherein the projection comprises an unwrapped, representation of the segmented object in a two-dimensional (2D) space. Because the input image represents a 2D image of the object, a portion of the projection generated based on the input image may not include complete occupancy or texture details. Accordingly, in some embodiments the 3D Try-On Pipeline 214 may predict the occupancy or texture details missing from the projection based on the existing texture details. The 3D Try-On Pipeline 214 may apply the texture details from the projection to the 3D shape in order to generate a UV texture map.

At operation 308, a 3D model is generated based on the 3D shape and the UV texture map, wherein the 3D model may comprise a portion of the 3D shape. For example, in some embodiments the 3D model may comprise representation of a head. Accordingly, the 3D model may be generated based on a portion of the 3D model of the head that corresponds with the hairline, such that the completed 3D model may comprise a 3D hair representation.

At operation 310, the 3D Try-On Pipeline 214 causes display of a presentation of the generated 3D model at a position within a target image. For example, the target image may include a depiction of a head. The 3D Try-On Pipeline 214 may present the 3D model upon the target image based on the position of the head within the target image.

Figure 4:
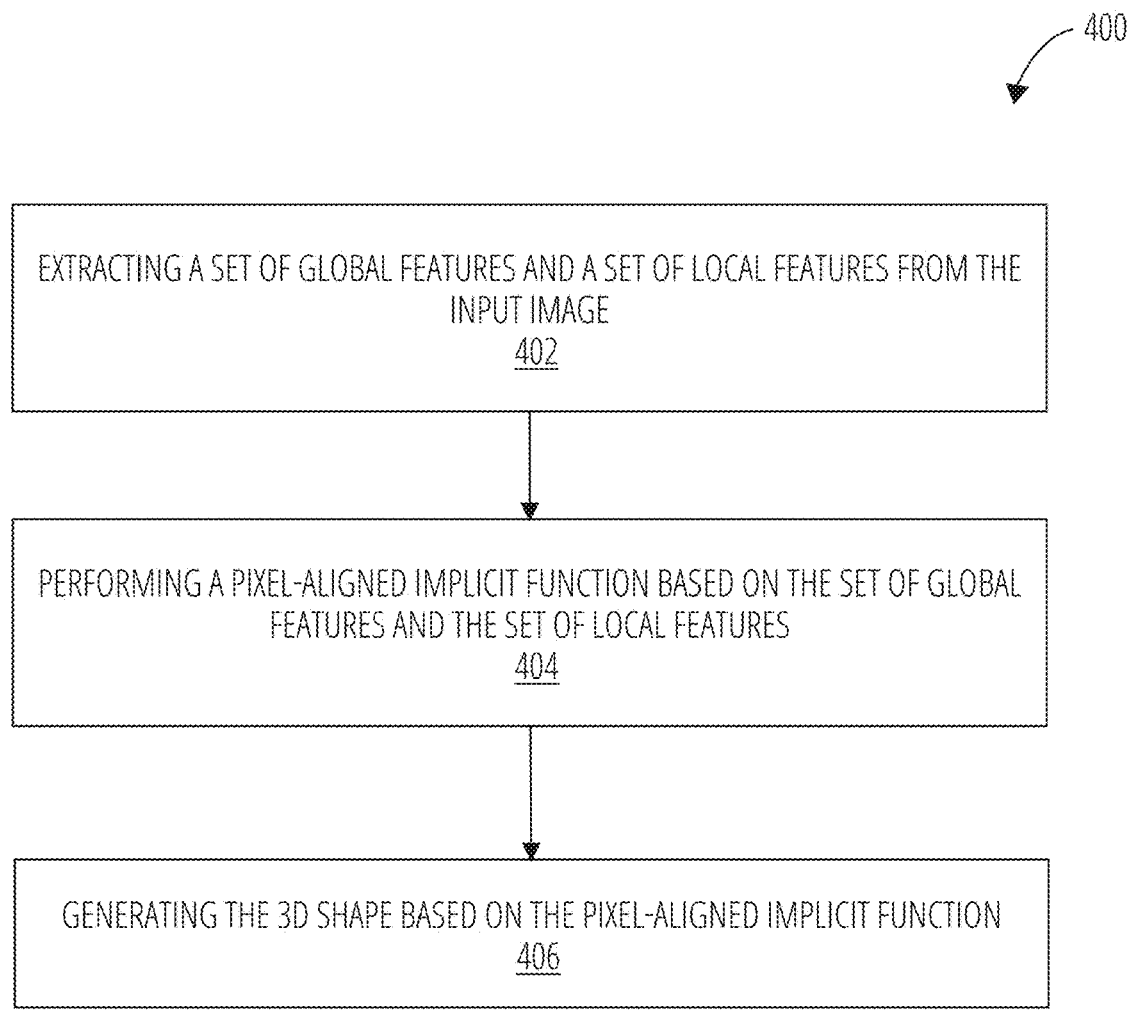
FIG. 4 is a flowchart depicting a method for generating a 3D shape based on an input image, in accordance with one embodiment, in accordance with one embodiment.

FIG. 4 is a flowchart illustrating operations of a 3D Try-On Pipeline 214 in performing a method 400 for generating a 3D shape based on an input image, in accordance with one embodiment. Operations of the method 400 may be performed by one or more subsystems of the messaging system 100 described above with respect to FIG. 2, such as the 3D Try-On Pipeline 214. In some embodiments, the method 400 may be performed as a subroutine of one or more operations of the method 300, such as operation 304. As shown in FIG. 4, the method 400 includes one or more operations 402, 404, and 406.

At operation 402, the 3D Try-On Pipeline 214 extracts a set of global features and a set of local features from the input image. Local features are pixel-aligned, and are therefore effective at predicting occupancy for visible pixels, while not being able to operate outside the image border. In contrast, global features are holistic are represent the shape as a whole and can estimate invisible parts.

Two neural networks may be trained to take a canonical coordinate, its corresponding 2D position, and the 2D image feature as inputs in order to estimate occupancy. To extract both local and global features from the input image, the 3D Try-On Pipeline 214 may use a "ResNet34" architecture. Pixel-aligned features may be extracted using bi-linear interpolation from four latent feature maps of ResNet34 respectively, and concatenate them together to form the local feature. The global feature is produced by a fully-connected layer following the last feature map of ResNet34.

At operation 404, the 3D Try-On Pipeline 214 performs a pixel-aligned implicit function based on the set of global features and the set of local features. Accordingly at operation 406, the 3D Try-On Pipeline 214 may reconstruct a 3D model (i.e., hair shape) by extending a framework of pixel-aligned implicit functions to use both global and local features to generate a 3D shape based on the input image.

Figure 5:
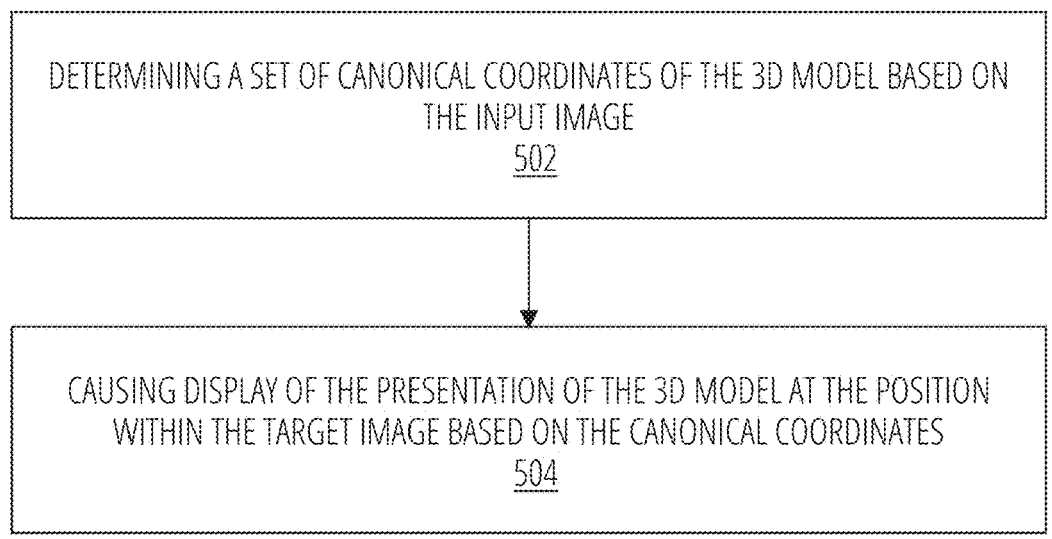
FIG. 5 is a flowchart depicting a method for presenting a 3D model on a target image, in accordance with one embodiment.

FIG. 5 is a flowchart illustrating operations of a 3D Try-On Pipeline 214 in performing a method 500 for presenting a 3D model on a target image, in accordance with one embodiment. Operations of the method 500 may be performed by one or more subsystems of the messaging system 100 described above with respect to FIG. 2, such as the 3D Try-On Pipeline 214. In some embodiments, the method 500 may be performed as a subroutine of one or more operations of the method 300, such as operation 310. As shown in FIG. 5, the method 500 includes one or more operations 502 and 504.

At operation 502, the 3D Try-On Pipeline 214 determines a set of canonical coordinates of the 3D model based on the input image. According to certain embodiments, canonical coordinates may include sets of coordinates within a phase space which can be used to describe a physical system at a given point in time. Accordingly, an orientation of an object depicted in an image, such as the input image, may be described based on a set of canonical coordinates. For example, the canonical coordinates of the 3D model may indicate a front side, back side, top, bottom, left, and right side of the 3D model.

In some embodiments, the canonical coordinates may be determined based on attributes of the input image. For example, the 3D Try-On Pipeline 214 may identify ab object depicted in the input image, and define canonical coordinates of the visible regions of the object depicted in the input image. For example, the front, left and right sides. The canonical coordinates of the 3D model may thereby be determined based on the coordinates of the object depicted in the input image.

At operation 504, the 3D Try-On Pipeline 214 causes display of a presentation of the 3D model at a position within a target image based on the canonical coordinates. For example, the 3D Try-On Pipeline 214 may determine corresponding canonical coordinates of an object depicted within the target image, and apply the 3D model to the target image based on the canonical coordinates of the 3D model and of the target image.

Figure 6:
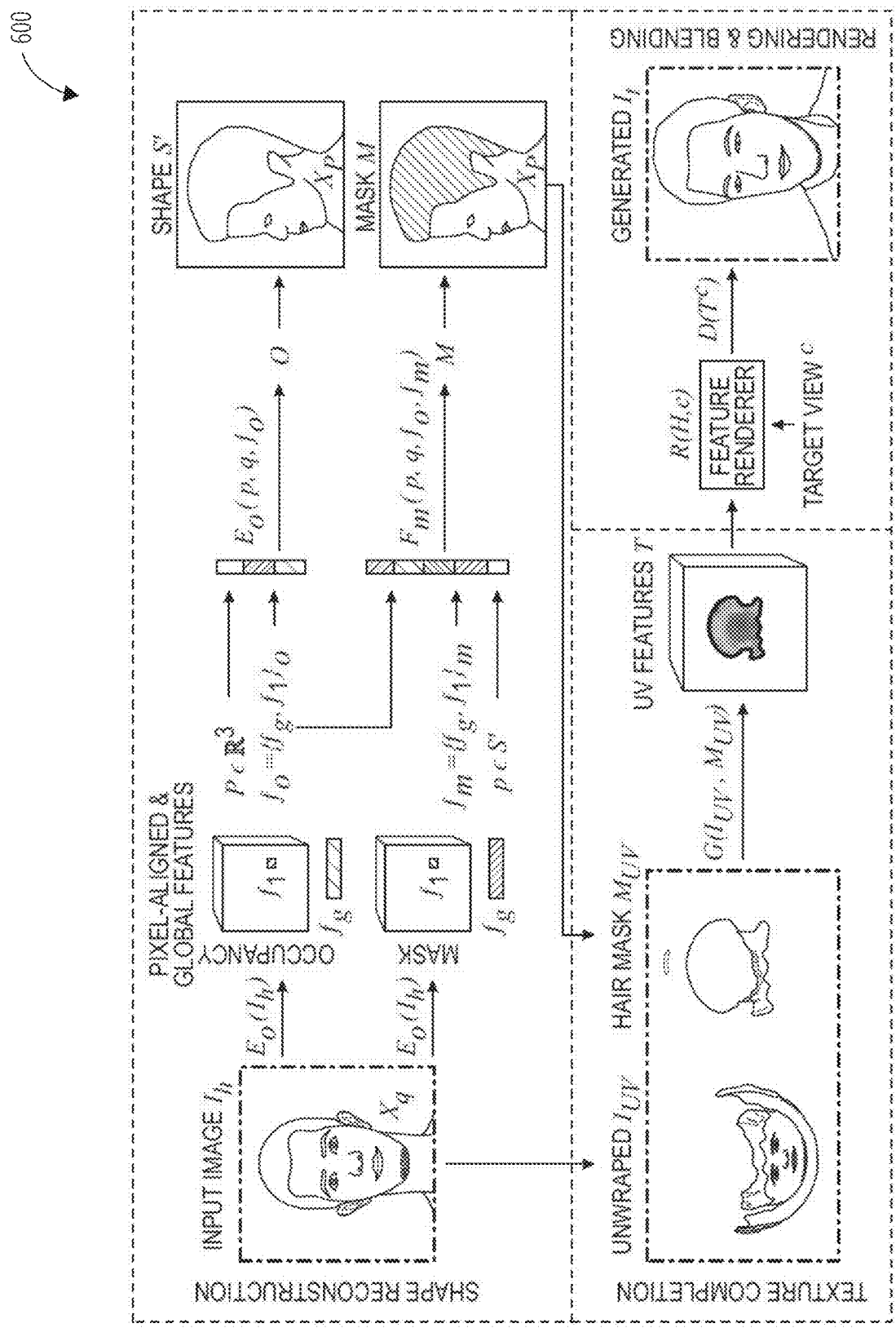
FIG. 6 is a diagram depicting a process of generating a 3D model, in accordance with one embodiment, in accordance with one embodiment.

FIG. 6 is a diagram 600 depicting a process of generating a 3D model, in accordance with one embodiment, in accordance with one embodiment. As seen in the diagram 600, the process of generating the 3D model based on an input image $I_h$ may comprise three distinct steps: shape reconstruction; texture/occupancy completion, and rendering and blending.

During shape reconstruction, as discussed in the method 400, the 3D Try-On Pipeline 214 extracts global and local features using a pair of image encoders $E_o$, and $E_m$. The features are then concatenated and used to predict occupancy O and the mask M.

During texture/occupancy completion, a UV feature map T is generated, as described in the method 300.

Figure 7:
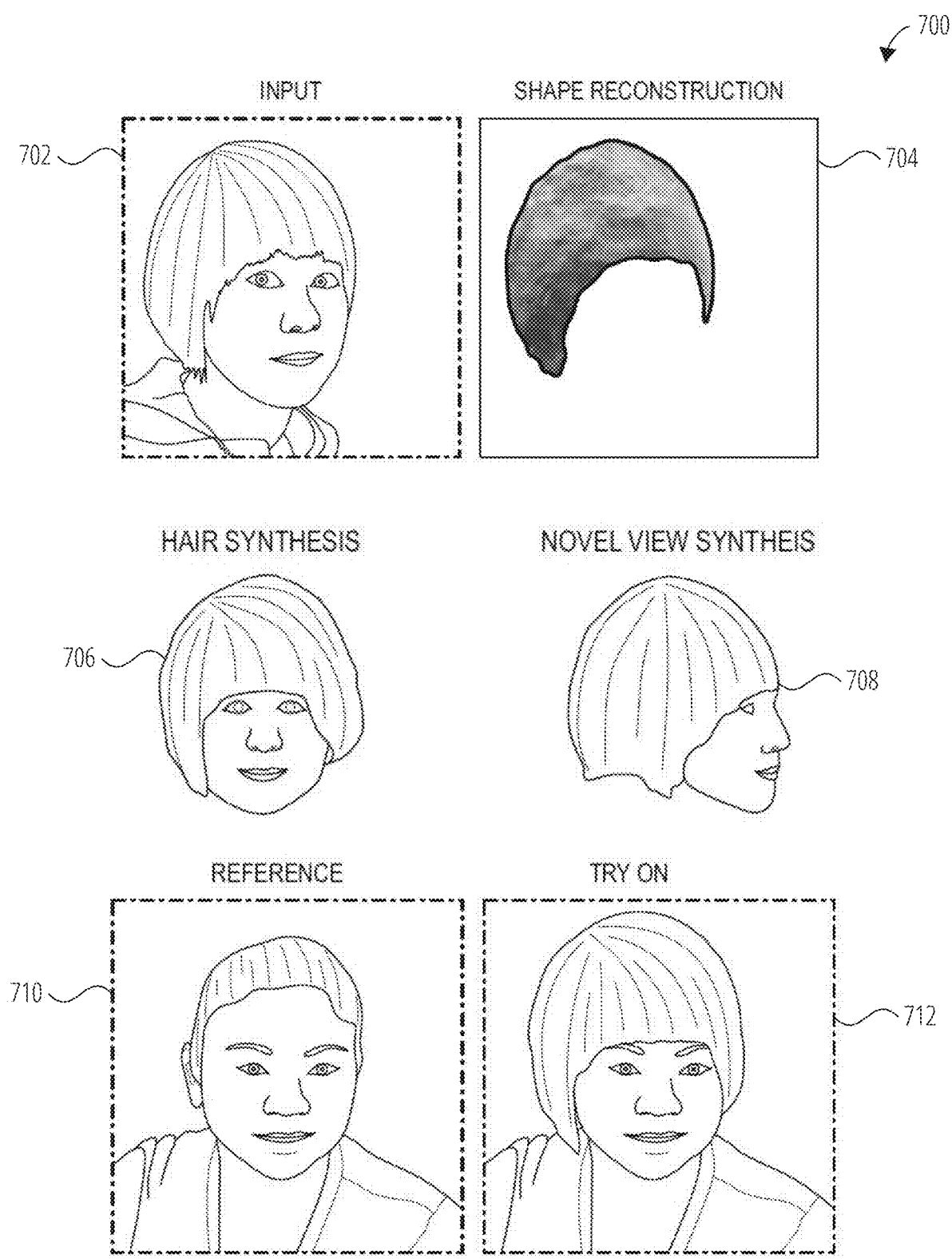
FIG. 7 is diagram depicting a 3D model, in accordance with one embodiment.

During rendering and blending, the UV feature map is then projected onto a novel view of a target image r, as specified by a camera c using a rendered R(H, c). A shallow decoder $D(T^c)$ maps the rendered features to an image space of the target image. 100721 FIG. 7 is a diagram 700 depicting a 3D model generated by the 3D Try-On Pipeline 214, in accordance with one embodiment.

As an illustrative example, the diagram 700 provide an example of an input image 702 which may be accessed by the 3D Try-On Pipeline 214. As seen in the diagram 700, the input image may include a depiction of a head. Based on the input image 702, the 3D Try-On Pipeline 214 may generate a 3D shape 704, as described in the methods 300 and 400 above.

According to certain embodiments, a 3D model generated by the 3D Try-On Pipeline 214 as described in the method 300 may include the hair synthesis 706. Because the hair synthesis 706 is a 3D model, the 3D Try-On Pipeline 214 may present the hair synthesis 706 in various novel positions 708.

As such, the 3D Try-On Pipeline 214 may access a target image 710, determine canonical coordinates associated with the target image 710 and the hair synthesis 706, and generate a rendered image 712 which includes a display of the hair synthesis 706 at a position within the target image 710.

Figure 8:
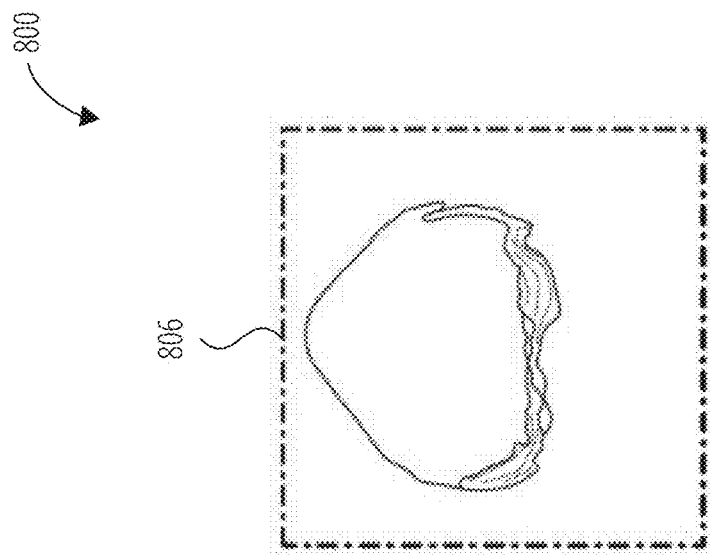
FIG. 8 is a diagram depicting a method for generating a UV texture map, in accordance with one embodiment, in accordance with one embodiment.
Figure 8:
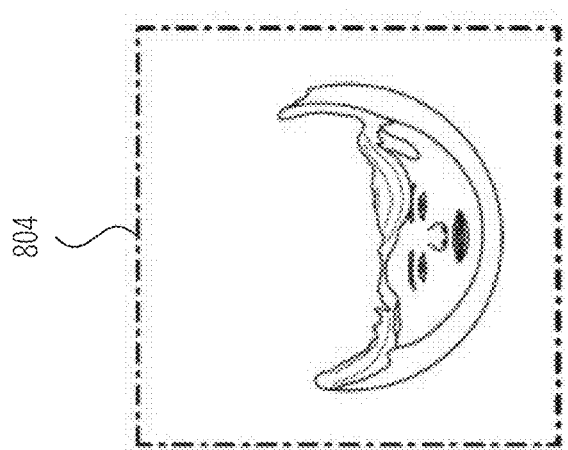
Figure 8:
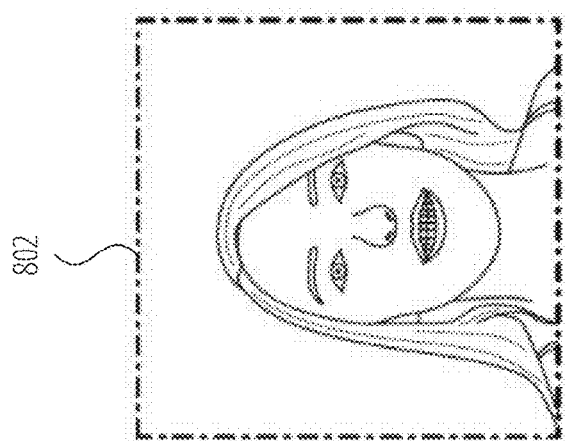

FIG. 8, is a diagram 800 depicting a method for generating a UV texture map, in accordance with one embodiment, in accordance with one embodiment.

As see in the diagram 800, the 3D Try-On Pipeline 214 may receive an input image 802, wherein the input image 802 includes a depiction of an object, such as a head.

The 3D Try-On Pipeline 214 may segment the depicted object from the input image 802 to generate an unwrapped projection 804. As seen in the diagram 800, the unwrapped projection 804 comprises unwrapped representation of the segmented object from the input image 802 in a two-dimensional (2D) space.

The 3D Try-On Pipeline 214 may then generate a segmentation mask 806, wherein the segmentation mask 806 comprises a portion of the unwrapped projection 804 that corresponds with hair depicted in the object, and further comprises an unoccupied extension determined based on a portion of the 3D shape. To fill the obstructed/invisible portion of the hair texture, a neural network is trained to take a partial image and the segmentation mask 806 as inputs in order to estimate/fill the obstructed/invisible portion of the hair texture.

Machine Architecture

Figure 9:
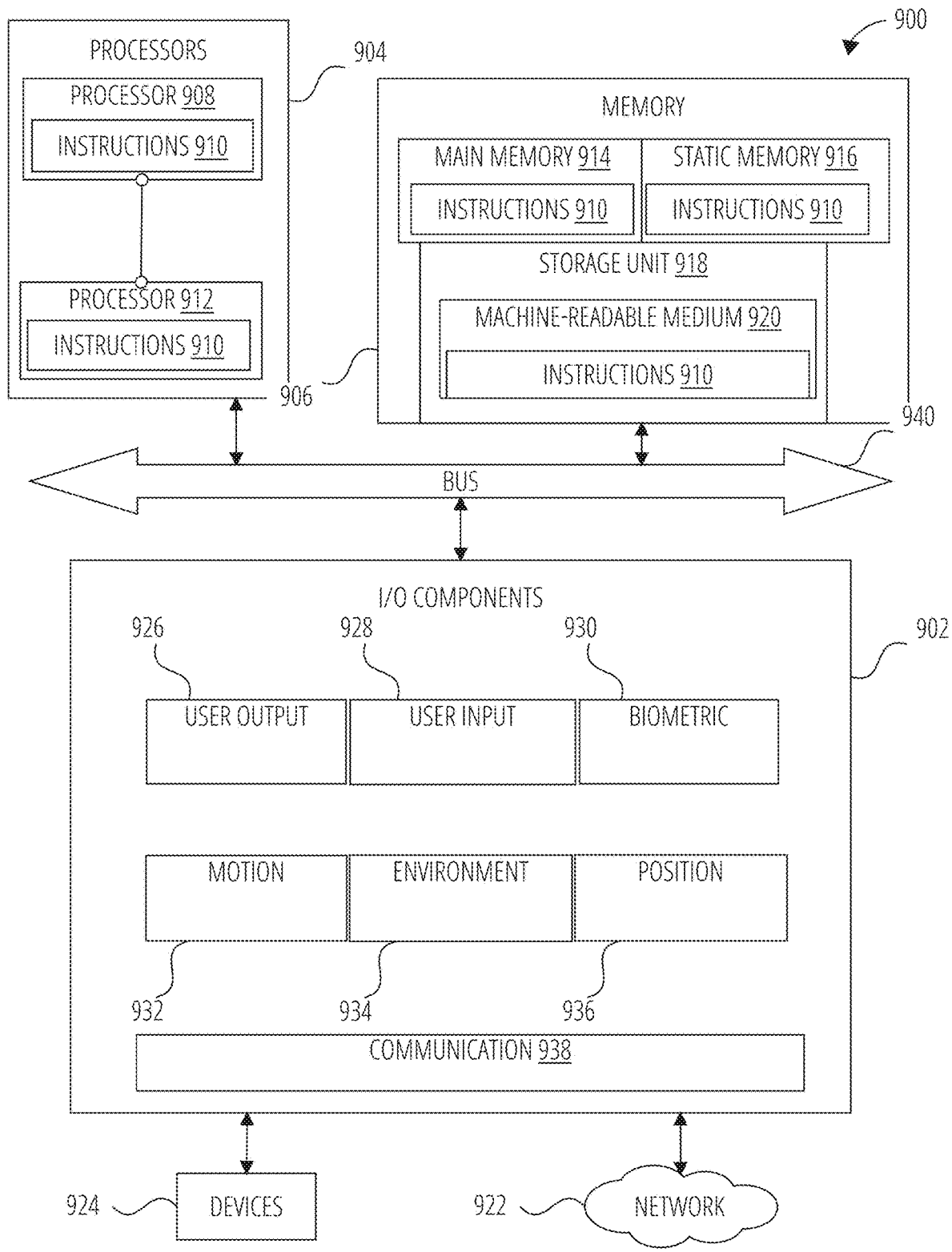
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 106 or any one of a number of server devices forming part of the messaging server system 104. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 638, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922, In further examples, the communication components 938 may include wired communication components, wireless communication components, cellular communication components, Near Field Communication (NFC) components, Bluetooth components (e.g., Bluetooth® Low Energy), components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Simi lady, the instructions 910 may be transmitted or received using a transmission medium via a coupling (e.g., a peer-to-peer coupling) to the devices 924.

Software Architecture

Figure 10:
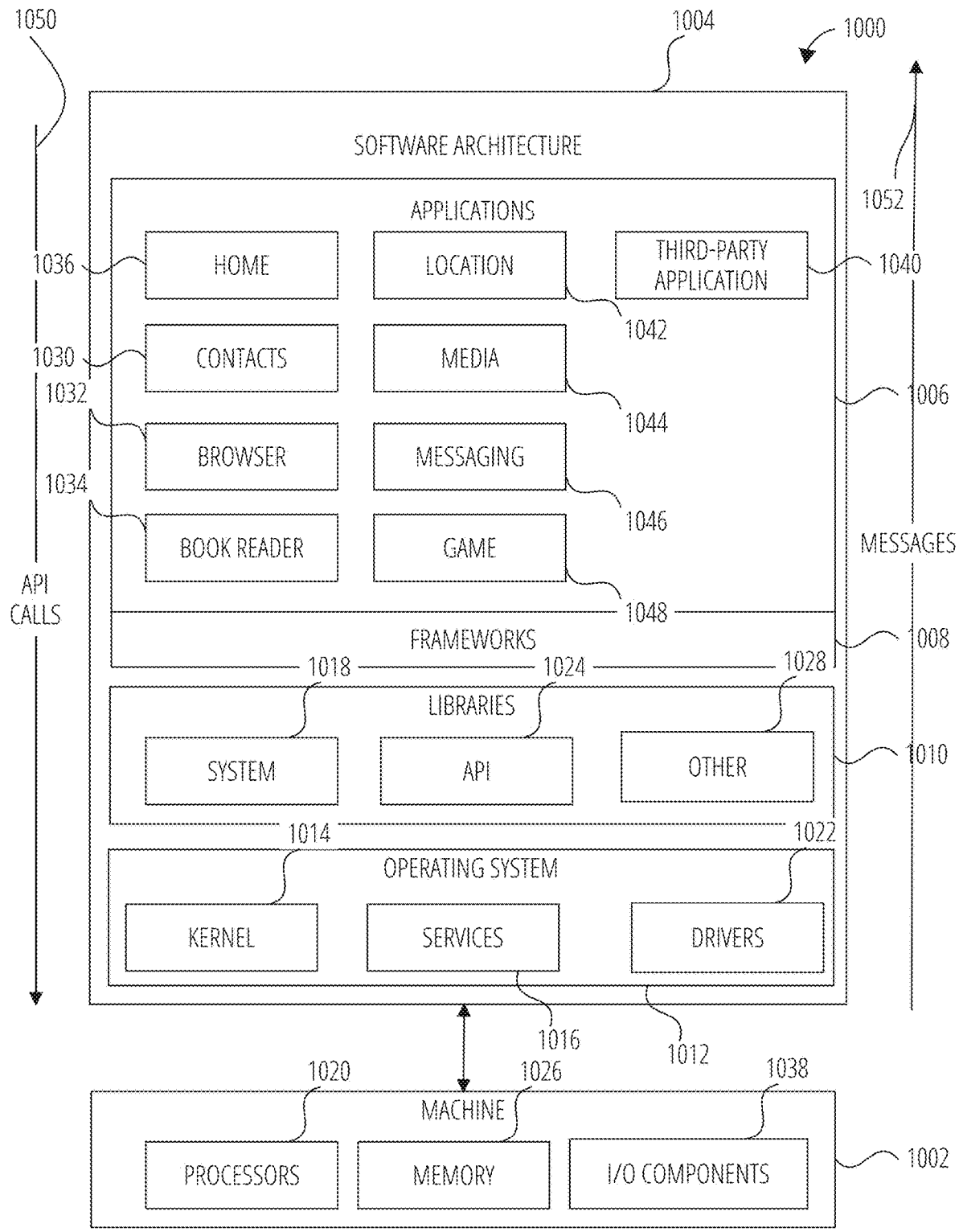
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and 110 components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers). WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Processing Components

Figure 11:
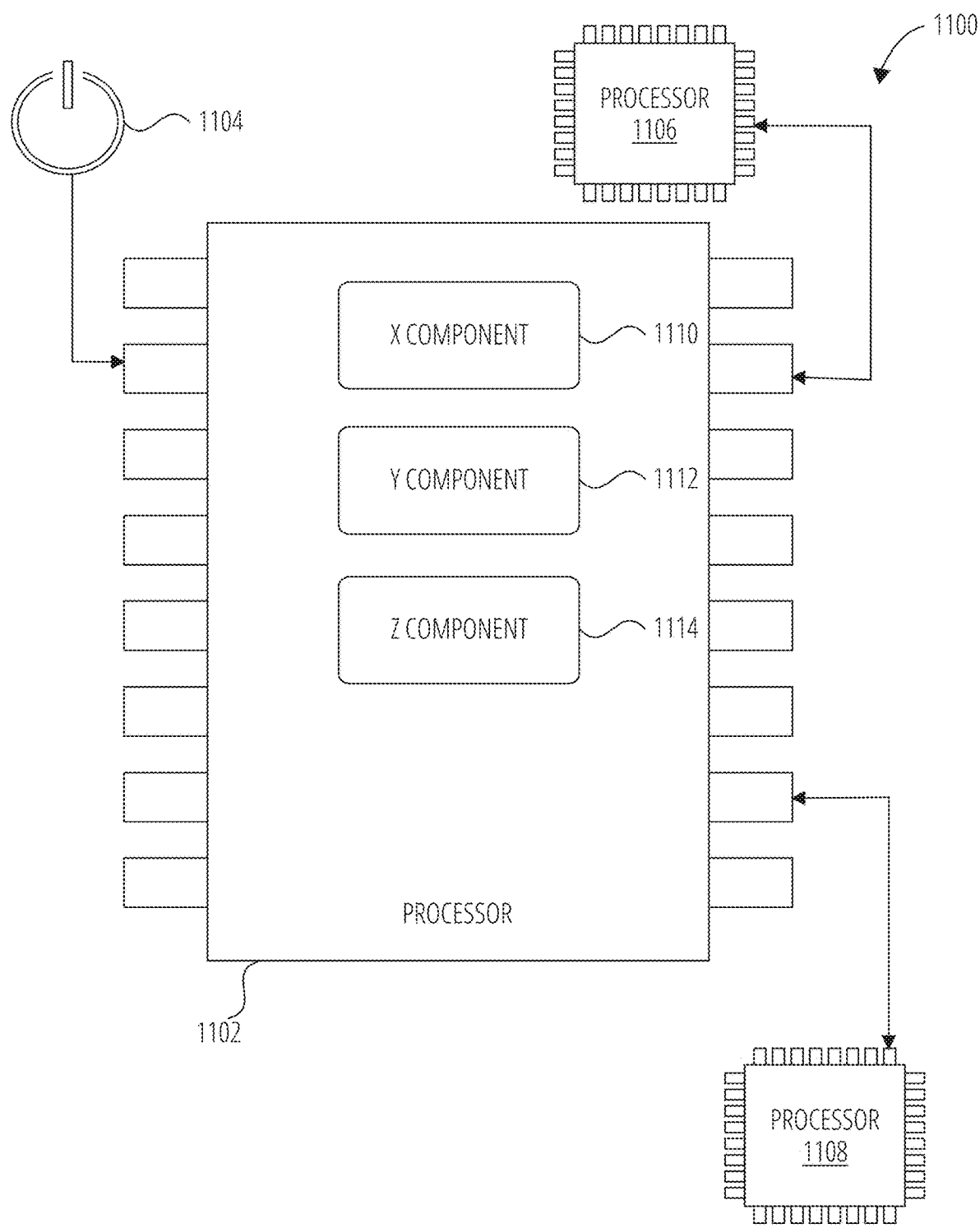
FIG. 11 is a diagrammatic representation of a processing environment, in accordance with some examples.

Turning now to FIG. 11, there is shown a diagrammatic representation of a processing environment 1100, which includes a processor 1102, a processor 1106, and a processor 1108 (e.g., a GPU, CPU or combination thereof).

The processor 1102 is shown to be coupled to a power source 1104, and to include (either permanently configured or temporarily instantiated) modules, namely an X component 1110, a Y component 1112, and a Z component 1114, operationally configured to perform operations as discussed in the method 300 of FIG. 3, and the method 400 of FIG. 4, in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process, A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
  accessing an input image, the input image comprising a set of image features that depict a display of an object;
  detecting an obstructed portion of the object based on the display of the object;
  generating an estimation of the obstructed portion based on a neural network;
  generating a three-dimensional (3D) shape based on the set of image features that depict the object and the estimation of the obstructed portion;
  generating a U, V coordinate system (UV) texture map based on the input image and the 3D shape;
  generating a 3D model based on the 3D shape and the UV texture map; and
  causing display of a presentation of the 3D model at a position within a target image.

2. The method of claim 1, wherein the generating the 3D shape based on the set of image features that depict the object further comprises:
  extracting a set of global features and a set of local features from the input image;
  performing a pixel-aligned implicit function based on the set of global features and the set of local features; and
  generating the 3D shape based on the pixel-aligned implicit function.

3. The method of claim 1, wherein the generating the UV texture map based on the input image and the 3D shape further comprises:
  generating a projection based on the input image;
  generating a segmentation mask based on a portion of the 3D shape; and
  generating the UV texture map based on the projection and the segmentation mask.

4. The method of claim 1, wherein the causing display of the presentation of the 3D model at the position within the target image further comprises:
  determining a set of canonical coordinates of the 3D model based on the input image; and
  causing display of the presentation of the 3D model at the position within the target image based on the canonical coordinates.

5. The method of claim 1, wherein the object depicted in the input image is a first object, and the causing display of the presentation of the 3D model at the position within the target image further comprises:
  identifying a second object within the target image; and
  causing display of the presentation of the 3D model at the position within the target image based on the second object.

6. The method of claim 5, wherein the causing display of the presentation of the 3D model at the position within the target image further comprises:
  adjusting a scale of the 3D model based on a size of the second object within the target image.

7. The method of claim 1, wherein the object includes a human head.

8. A system comprising:
  one or more processors; and
  a memory comprising instructions which, when executed by the one or more processors, cause the one or more processors to perform operations comprising:
  accessing an input image, the input image comprising a set of image features that depict a display of an object;
  detecting an obstructed portion of the object based on the display of the object;
  generating an estimation of the obstructed portion based on a neural network;
  generating a three-dimensional (3D) shape based on the set of image features that depict the object and the estimation of the obstructed portion;
  generating a U, V coordinate system (UV) texture map based on the input image and the 3D shape;
  generating a 3D model based on the 3D shape and the UV texture map; and
  causing display of a presentation of the 3D model at a position within a target image.

9. The system of claim 8, wherein the generating the 3D shape based on the set of image features that depict the object further comprises:
  extracting a set of global features and a set of local features from the input image;
  performing a pixel-aligned implicit function based on the set of global features and the set of local features; and
  generating the 3D shape based on the pixel-aligned implicit function.

10. The system of claim 8, wherein the generating the UV texture map based on the input image and the 3D shape further comprises:
  generating a projection based on the input image;
  generating a segmentation mask based on a portion of the 3D shape; and
  generating the UV texture map based on the projection and the segmentation mask.

11. The system of claim 8, wherein the causing display of the presentation of the 3D model at the position within the target image further comprises:
  determining a set of canonical coordinates of the 3D model based on the input image; and
  causing display of the presentation of the 3D model at the position within the target image based on the canonical coordinates.

12. The system of claim 8, wherein the object depicted in the input image is a first object, and the causing display of the presentation of the 3D model at the position within the target image further comprises:
  identifying a second object within the target image; and
  causing display of the presentation of the 3D model at the position within the target image based on the second object.

13. The system of claim 5, wherein the causing display of the presentation of the 3D model at the position within the target image further comprises:
  adjusting a scale of the 3D model based on a size of the second object within the target image.

14. The wherein the object of claim 8, wherein the object includes a human head.

15. A non-transitory machine-readable storage medium comprising instructions that, when executed by one or more processors of a machine, cause the machine to perform operations comprising:
  accessing an input image, the input image comprising a set of image features that depict a display of an object;
  detecting an obstructed portion of the object based on the display of the object;

generating an estimation of the obstructed portion based on a neural network;
generating a three-dimensional (3D) shape based on the set of image features that depict the object and the estimation of the obstructed portion;
generating a U, V coordinate system (UV) texture map based on the input image and the 3D shape;
generating a 3D model based on the 3D shape and the UV texture map; and
causing display of a presentation of the 3D model at a position within a target image.

16. The non-transitory machine-readable storage medium of claim 15, wherein the generating the 3D shape based on the set of image features that depict the object further comprises:
    extracting a set of global features and a set of local features from the input image;
    performing a pixel-aligned implicit function based on the set of global features and the set of local features; and
    generating the 3D shape based on the pixel-aligned implicit function.

17. The non-transitory machine-readable storage medium of claim 15, wherein the generating the UV texture map based on the input image and the 3D shape further comprises:
    generating a projection based on the input image;
    generating a segmentation mask based on a portion of the 3D shape; and
    generating the UV texture map based on the projection and the segmentation mask.

18. The non-transitory machine-readable storage medium of claim 15, wherein the causing display of the presentation of the 3D model at the position within the target image further comprises:
    determining a set of canonical coordinates of the 3D model based on the input image; and
    causing display of the presentation of the 3D model at the position within the target image based on the canonical coordinates.

19. The non-transitory machine-readable storage medium of claim 15, wherein the object depicted in the input image is a first object, and the causing display of the presentation of the 3D model at the position within the target image further comprises:
    identifying a second object within the target image; and
    causing display of the presentation of the 3D model at the position within the target image based on the second object.

20. The non-transitory machine-readable storage medium of claim 19, wherein the causing display of the presentation of the 3D model at the position within the target image further comprises:
    adjusting a scale of the 3D model based on a size of the second object within the target image.

* * * * *